United States Patent
Allen et al.

(10) Patent No.: US 8,085,132 B2
(45) Date of Patent: *Dec. 27, 2011

(54) METHOD AND APPARATUS FOR RESOLVING RFID-BASED OBJECT TRAFFIC TRANSACTIONS TO A SINGLE OBJECT IN THE PRESENCE OF A PLURALITY OF OBJECTS

(76) Inventors: Barry Allen, Kelowna (CA);
Christopher Adamson, Kelowna (CA);
David Lambacher, Westbank (CA)

( * ) Notice: Subject to any disclaimer, the term of this patent is extended or adjusted under 35 U.S.C. 154(b) by 1008 days.

This patent is subject to a terminal disclaimer.

(21) Appl. No.: 12/010,394

(22) Filed: Jan. 24, 2008

(65) Prior Publication Data

US 2008/0191844 A1 Aug. 14, 2008

Related U.S. Application Data

(63) Continuation-in-part of application No. 11/007,326, filed on Dec. 9, 2004, now Pat. No. 7,345,576.

(60) Provisional application No. 60/528,193, filed on Dec. 10, 2003.

(51) Int. Cl.
*H04Q 5/22* (2006.01)
(52) U.S. Cl. .................................. 340/10.2; 340/572.4
(58) Field of Classification Search ............... 340/10.2, 340/10.1, 572.1, 572.4, 8.1, 539.13, 539.32; 342/457; 235/437
See application file for complete search history.

(56) References Cited

U.S. PATENT DOCUMENTS

| | | | | |
|---|---|---|---|---|
| 5,008,661 A * | 4/1991 | Raj | ............................. | 340/10.51 |
| 5,565,858 A * | 10/1996 | Guthrie | ...................... | 340/10.33 |
| 5,680,459 A | 10/1997 | Hook et al. | | |
| 5,686,902 A | 11/1997 | Reis et al. | | |
| 5,920,287 A | 7/1999 | Belcher et al. | | |
| 5,963,134 A * | 10/1999 | Bowers et al. | ............. | 340/572.1 |
| 6,040,774 A * | 3/2000 | Schepps | ..................... | 340/572.1 |
| 6,097,301 A | 8/2000 | Tuttle | | |
| 6,380,894 B1 | 4/2002 | Boyd et al. | | |
| 6,552,661 B1 | 4/2003 | Lastinger et al. | | |
| 6,557,238 B1 | 5/2003 | Becherucci et al. | | |
| 7,345,576 B2 * | 3/2008 | Allen et al. | .................. | 340/10.2 |

FOREIGN PATENT DOCUMENTS

CA 2081752 7/1999

* cited by examiner

*Primary Examiner* — Edwin Holloway, III
(74) *Attorney, Agent, or Firm* — Antony C. Edwards

(57) ABSTRACT

A method for resolving RFID-based object traffic transactions to a single object in the presence of a plurality of objects, where the method includes the steps of: monitoring RFID object traffic transactions to a single object amongst a plurality of objects wherein the traffic transactions are between at least one RFID reader and a plurality of detected RFID tags detected by the at least one RFID reader; calculating a cumulative and weighted data set for each detected RFID tag of the RFID tags; and, comparing the data set for each detected RFID tag with the data set for other of the detected RFID tags and identifying one RFID tag of the detected RFID tags having a greatest cumulative weight calculated for its corresponding data set so as to resolve multiple detections and identifications of the detected RFID tags in the object traffic transactions to the single object.

30 Claims, 8 Drawing Sheets

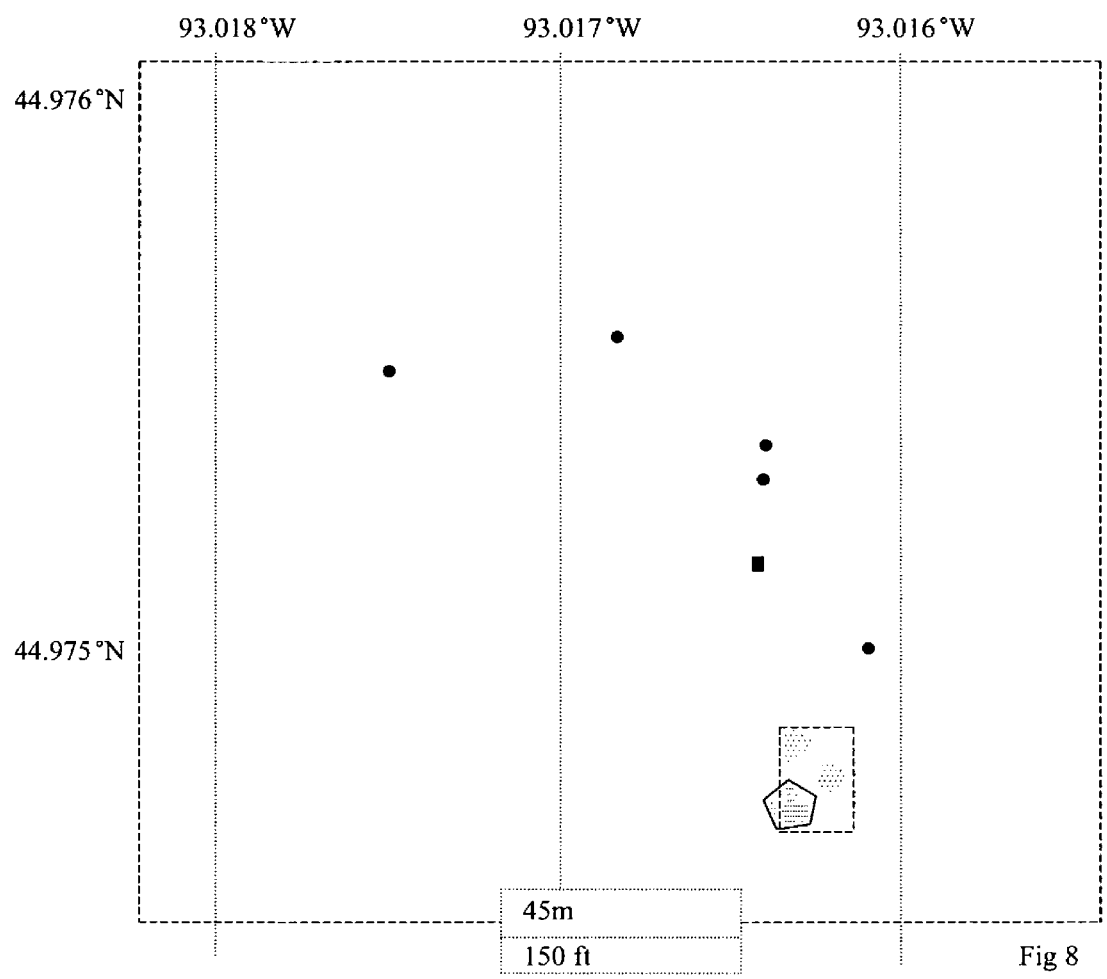

METHOD AND APPARATUS FOR RESOLVING RFID-BASED OBJECT TRAFFIC TRANSACTIONS TO A SINGLE OBJECT IN THE PRESENCE OF A PLURALITY OF OBJECTS

CROSS REFERENCE TO RELATED APPLICATION

This application is a continuation-in-part of U.S. patent application Ser. No. 11/007,326 filed Dec. 9, 2004, now U.S. Pat. No. 7,345,576, which claims priority from U.S. Provisional Patent Application Ser. No. 60/528193 filed Dec. 10, 2003 entitled Method for Resolving RFID-Based Object Traffic Transactions to a Single Container in the Presence of a Plurality of Containers.

FIELD OF THE INVENTION

This invention relates to the field of radio frequency identification systems and in particular to a system employing radio frequency identification readers and tags in a networked environment wherein a processor calculates and compares a weighted data set to resolve multiple tag reads in object traffic transactions to a single object in the presence of a plurality of objects.

BACKGROUND OF THE INVENTION

Radio frequency identification (RFID) systems have been proposed for identifying tagged objects for such purposes as taking inventory or tracking movements of objects being transported. Examples are described in U.S. Pat. Nos. 6,097,301, 5,300,875; 5,365,551; and 5,448,110.

As known in the prior art, and as described by Tuttle in his U.S. Pat. No. 6,097,301 entitled RF Identification System with Restricted Range which issued Aug. 1, 2000, RFID systems generally employ a passive or active RF transceiver, called a "tag", mounted on each object to be identified or tracked.

Conventional RFID systems provide little or no interactive feedback in response to actions for example those performed by human operators. Specifically, conventional RFID systems lack any means for discriminating in favor of an individual tagged object that a human operator is working with at any given moment; instead, conventional RFID systems generally would confuse the operator by providing information regarding all the tagged objects in the vicinity. Furthermore, if a number of personnel are working close to each other, conventional RFID systems cannot direct information about a tag to the specific individual who is handling the tagged object.

By way of one example, suppose a number of postal personnel are sorting or routing tagged packages according to the destination encoded in a tag attached to each package. Conventional RFID systems lack any means for detecting which individual package a human handler is about to pick up so as to provide to the operator only the destination or routing information for the package that person currently is handling, to the exclusion of information about other nearby packages.

By way of a further example, locating a single automobile parked in so-called vehicle distribution centers where tens of thousands of such automobiles may be parked in a dense array is conventionally a time consuming task which is prone to trial and error and which would using conventional prior art RFID systems preclude detecting the single sought after automobile to the exclusion of information about other nearby vehicles.

SUMMARY OF THE INVENTION

In summary, the present invention may be characterized in a first aspect as a method for resolving RFID-based object traffic transactions to a single container in the presence of a plurality of containers, where the method comprises the steps of:
  a) monitoring RFID object traffic transactions to a single object amongst a plurality of objects wherein the traffic transactions are between at least one RFID reader and a plurality of detected RFID tags detected by the at least one RFID reader,
  b) calculating a cumulative and weighted data set for each detected RFID tag of the plurality of detected RFID tags, and
  c) comparing the data set for each detected RFID tag with the data set for other of the detected RFID tags and identifying one RFID tag of the detected RFID tags having a greatest cumulative weight calculated for its corresponding data set so as to resolve multiple detections and identifications of the detected RFID tags in the object traffic transactions to the single object.

The data set may include in one embodiment, not intended to be limiting, the following data for each detected RFID tag: radio frequency signal strength, an incremental count of the number of the RFID tag detections and identifications, and the corresponding clock time for each count in the incremental count. In other embodiments the data set may also or alternatively include one or more of the following data: geographic coordinates, for example global positioning satellite (GPS) coordinates; temperature, pressure, various sensed voltage levels, etc.

Thus, one means of identifying the location of the RFID reader, in order to facilitate the tag location calculation, is to capture the current latitude and longitude of the reader provided by the global positioning system (GPS). There is random error in the GPS-reported location, but the error is nearly constant over short time periods. Therefore, if the error at a point in time can be determined, a correction factor can be applied that will be valid over several minutes that will significantly reduce the actual location error. To calibrate for the current GPS error, RFID tags are installed in fixed known locations. Every time an RFID reader comes in close proximity to a "locator" tag, the current error in the location reported by GPS is calculated and a correction factor applied to all tag location calculations.

The data in the data set may be equally or differentially weighted, depending on the application of the method which in turn will determine a different set of weighting or business process rules. For example, in one example elaborated below of a postal handling application, the business process rules for that application may indicate that advantageously the data is, in order of most important to least important, weighted by the signal strength, the incremental count, and the corresponding clock time. In the further example of locating a vehicle in a vehicle distribution center, the business process rules are augmented by a close-proximity homing or attention-attracting device such as, in the automobile example, the car alarm function which is triggered by the use of a spoof or copy or counterfeit of the "panic" button code from the specific vehicle's keyfob.

In the applications involving containers, the method may further include the step of mounting the at least one RFID reader on at least one container of the plurality of containers. Conversely, the method may also include the step of mounting the RFID reader adjacent, for example directly on the clothing of a person sorting objects into the plurality of containers, and mounting the RFID tags on the plurality of containers. The method may also include the step of adding to the data set data from an object detection sensor. The method may also include the step of mounting the object detection sensor on each of the RFID tags.

In a further aspect, the present invention may be characterized as a system including devices for resolving RFID-based object traffic transactions to a single object in the presence of a plurality of objects, wherein the system includes:
  a) at least one RFID reader and a plurality of RFID tags detectable by the reader,
  b) means for monitoring RFID object traffic transactions to a single object amongst a plurality of objects wherein the traffic transactions are between the at least one RFID reader and the plurality of detected RFID tags detected by the at least one RFID reader,
  c) processing means for calculating a cumulative and weighted data set for each detected RFID tag of the RFID tags,
  d) processing means for comparing the data set for the each detected RFID tag with the data set for other of the detected RFID tags and identifying one RFID tag of the detected RFID tags having a greatest cumulative weight calculated for its corresponding the data set so as to resolve multiple detections and identifications of the detected RFID tags in the object traffic transactions to the single object.

The weighted data set may include in one embodiment at least the following data for each detected RFID tag: radio frequency signal strength, an incremental count of the number of the RFID tag detections and identifications, and the corresponding clock time for each count in the incremental count. As stated above, in one example, the data may be, in order of most important to least important, weighted by the signal strength, the incremental count, and the corresponding clock time. The data set may also advantageously include data from an object detection sensor, for example a motion detector sensor. The object detection sensor may be mounted on each RFID reader, or may be mounted on each of the RFID tags. In one embodiment, the RFID readers interrogate the RFID tags for the identification of the tags.

BRIEF DESCRIPTION OF THE DRAWINGS

FIGS. 2-4 are logic flow charts according to one embodiment of the present invention wherein FIG. 2 is a flow chart of the overall algorithm, FIG. 3 is a single RFID tag elimination subroutine in the flow chart of FIG. 2, and FIG. 4 is a single RFID reader elimination subroutine in the flow chart of FIG. 2.

FIG. 5a is an enlarged perspective view of a portion of FIG. 5.

FIG. 6a is an enlarged perspective view of a portion of FIG. 6.

FIG. 8 is a diagrammatic representation of a calculated outer location boundary using the proximity zones of FIG. 7 and of an inner location boundary calculated within the outer boundary using weighting and the logical pyramid.

DETAILED DESCRIPTION OF EMBODIMENTS OF THE INVENTION

Figure 1:
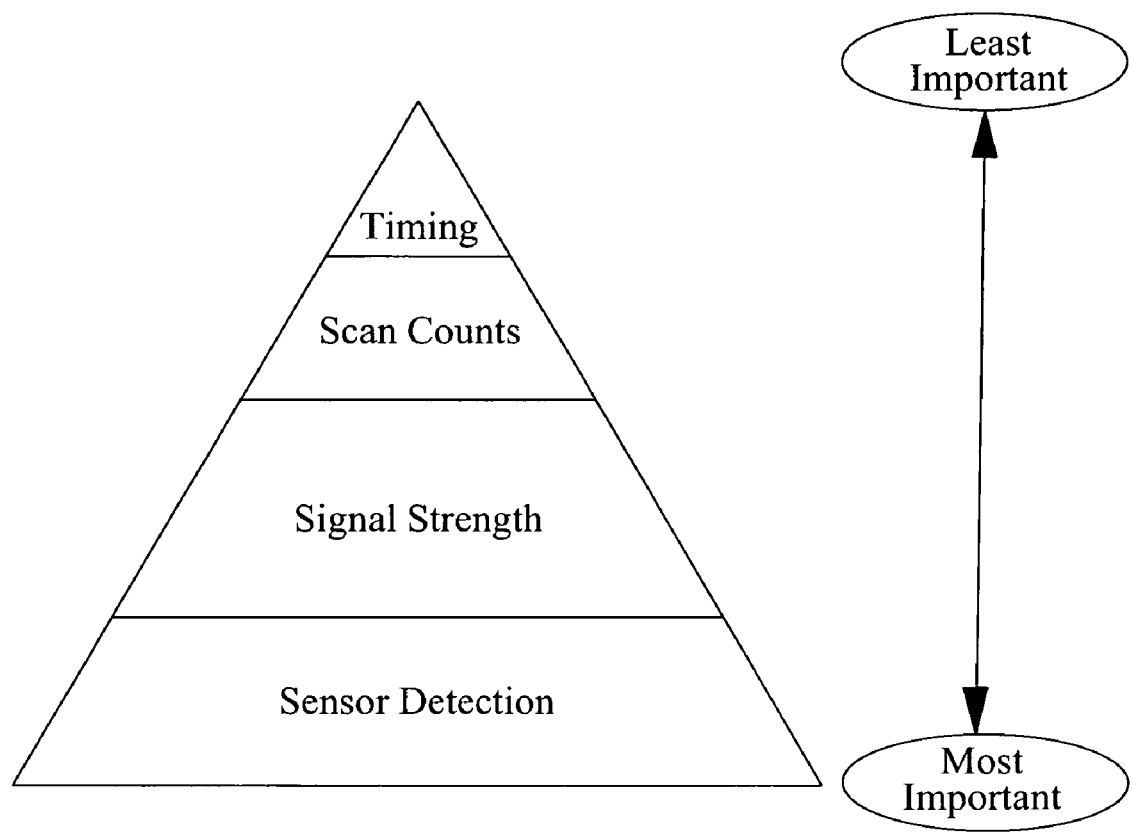
FIG. 1 is a diagrammatic illustration of a logical pyramid applied to the weighting of data in the method according to one illustrative example of the present invention.

As stated above, Radio Frequency Identification (RFID) tags are electronic devices that communicate via radio transmissions. As discussed in U.S. Pat. No. 6,563,417 which issued May 13, 2003 to Shaw for an invention entitled Interrogation, Monitoring and Data Exchange Using RFID Tags, incorporated herein by reference, RFID Tags may be programmed to be intelligent or just respond with a simple identification (ID) to radio frequency interrogations, and, by virtue of their communications links, are a tool to aid automation. The use of RFID technology may result in having many, even hundreds or thousands of RFID tags concurrently within radio communication range with a single RFID tag interrogator or reader. However, it is frequently important to correctly and automatically associate a business transaction to a specific RFID tag, that is, without human intervention.

RFID architectures are designed to maximize the probability that RFID tags are correctly read. Business processes using RFID may depend on quickly reading all the RFID tags that are within a given RFID read zone. Further, it is impossible given current state of the art to accurately control the extent of the read zone for RFID tags, notwithstanding the attempts of Tuttle and others in the prior art. This presents a problem when the business process requires that a specific tag be associated to an object or event when (herein collectively referred to as an object) potentially many tags are inside the read zone.

In the prior art, Tuttle gives the example of baggage handling in an airport. In a comparable example, a postal worker must load packages into bulk containers, the packages and the bulk containers both having destinations written on them—each bulk container then going to a different destination. In a conventional postal environment, the bulk containers are arranged side-by-side in a "U" shape around the worker. The business process in this example requires validation that the worker placed the package in the correct bulk container. The validation must occur automatically without changing how the worker ordinarily completes the task.

In another example, such as in the parking lot of a vehicle distribution center with many and sometimes tens of thousands of visually similar objects are parked in close proximity, it is required to provide feedback to workers to help them select a specific object, i.e. vehicle, amongst the many. In the case of the vehicle distribution center,
  a. there is a database listing all of the vehicles that are on the lot,
  b. the RFID system knows the identity and location of the vehicles that are currently being worked
  c. the vehicles normally have a keyless entry system which includes the ability to flash the vehicle's lights and/or sound the vehicle's born, and
  d. The codes for the keyless entry systems are factory-programmed, therefore the manufacturer is able to match a keyless code to a specific vehicle.

The business process in this example requires the zeroing-in on a specific vehicle within a dense pack of parked vehicles using mobile or stationary readers to reduce the search area using the logical period weighting of data according to one aspect of the present invention, and probability zones according to a further aspect as described below to determine a somewhat precise location (for example within a 40 foot radius), and then triggering the vehicle's attention-attracting device such as its alarm to allow the searcher to immediately locate the specific vehicle being sought.

One means of identifying the location of the RFID reader, in order to facilitate the tag location calculation, is to capture the current latitude and longitude of the reader provided by the global positioning system (GPS). There is random error in the GPS-reported location, but the error is nearly constant over short time periods. Therefore, if the error at a point in time can be determined, a correction factor can be applied that will be valid over several minutes that will significantly reduce the actual location error. To calibrate for the current GPS error, RFID tags are installed in fixed known locations. Every time an RFID reader comes in close proximity to a "locator" tag, the current error in the location reported by GPS is calculated and a correction factor applied to all tag location calculations.

These examples only describe two specific problems where the method of the present invention applies to provide a solution, but this is not intended to be limiting as the method of the present invention provides a generic solution to similar problems in many instances in the use of RFID tags as would be known to one skilled in the art.

A solution according to the present invention of the problem outlined in the postal example may be achieved using RFID tags and readers together with software algorithms and, in some instances, sensors attached to RFID tags.

Figure 2:
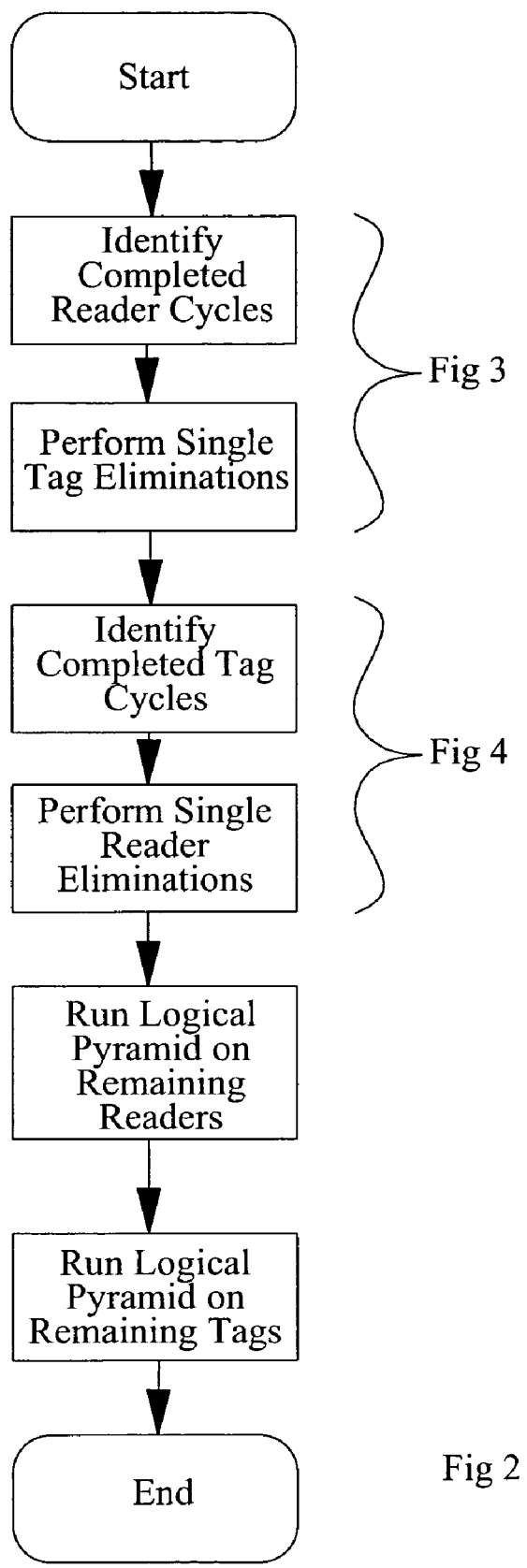
Figure 3:
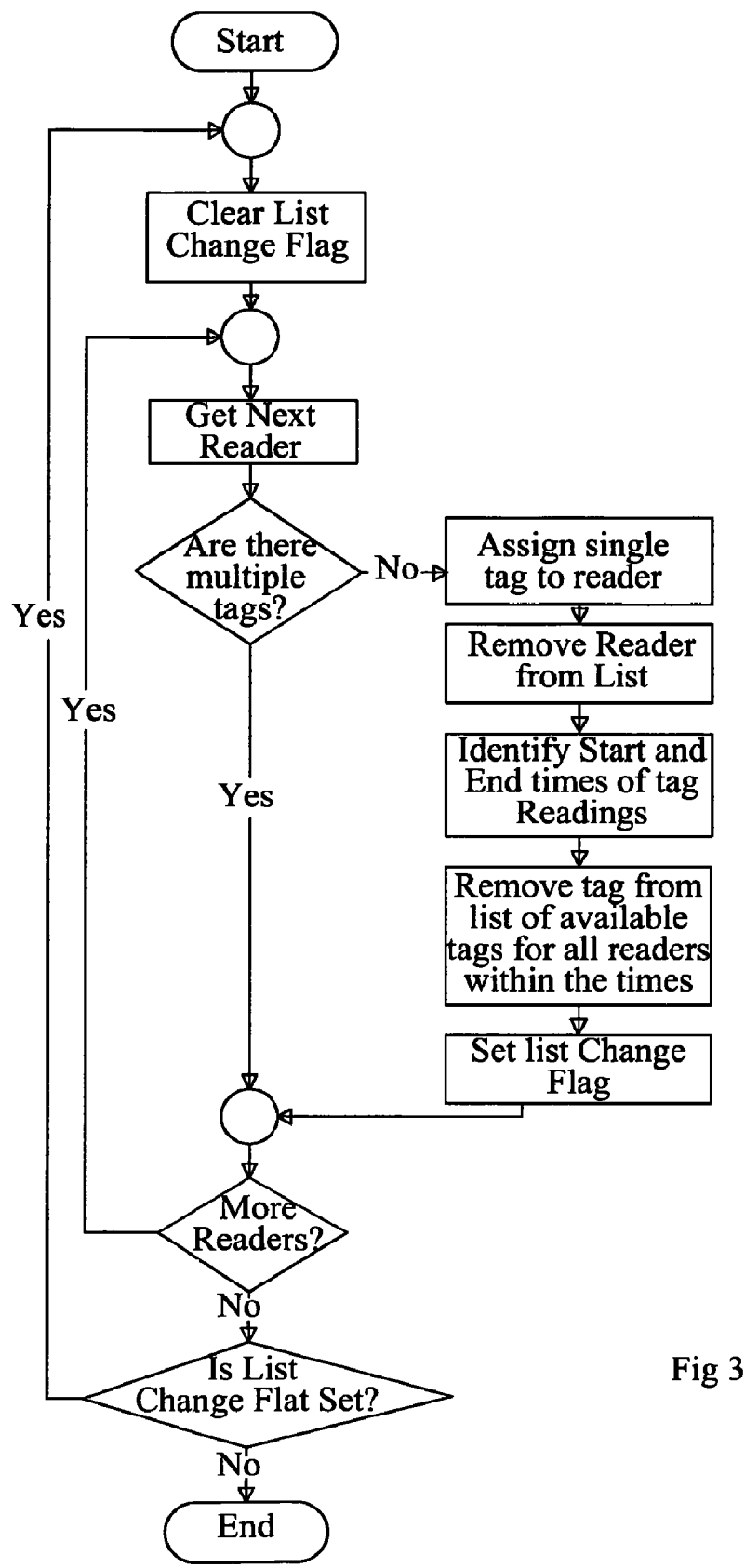
Figure 4:
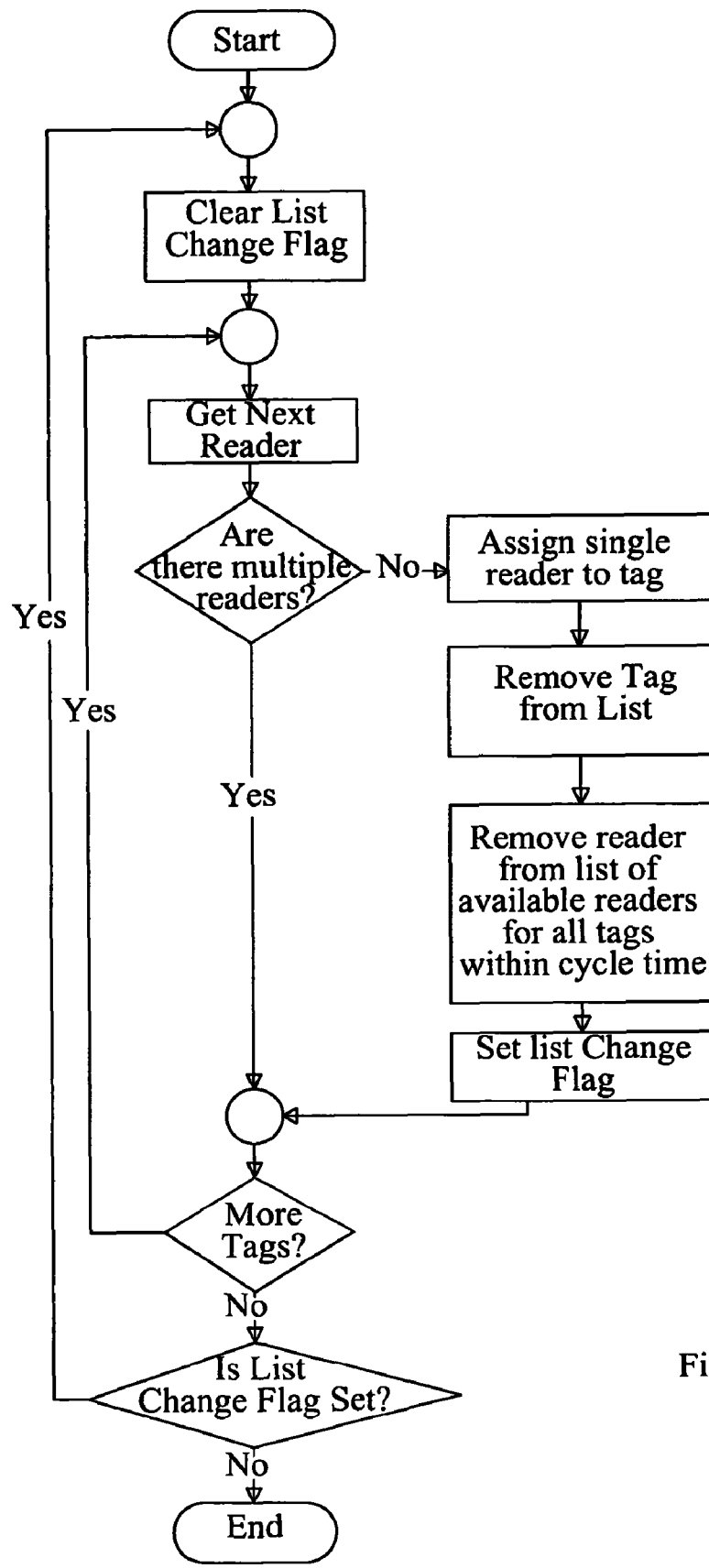

A logical pyramid is diagrammatically illustrated in FIG. 1 by way of example, which is not intended to be limiting. A logical pyramid such as illustrated in FIG. 1 may be applied so as to apply business rules for a particular application to collected data. In the first example herein, the logical pyramid is applied to data collected from RFID tags and readers and incorporating business rules for postal handling. The logic for implementing the postal handling example is embedded in the software such as the illustrated algorithm of FIGS. 2-4, so that it is possible to resolve detection of multiple tags to a unique traffic transaction "event" between an RFID reader and a unique RFID tag. The postal handling example of how this could be implemented is illustrated in FIGS. 2, 3 and 4, which presents a software flowchart for an implementation using RFID readers which interrogate RFID tags ("reader-talks-first" RFID tags) for example using motion detecting sensors with a plurality of RFID readers in the same workspace. The software algorithm in a sense culls out the readers and tags which are not involved in a traffic transaction involving multiple readers and/or multiple detected tags and so does not need resolving and then moves on to resolve using weighted data sets traffic transactions which do involve multiple readers and/or multiple detected tags.

Figure 5:
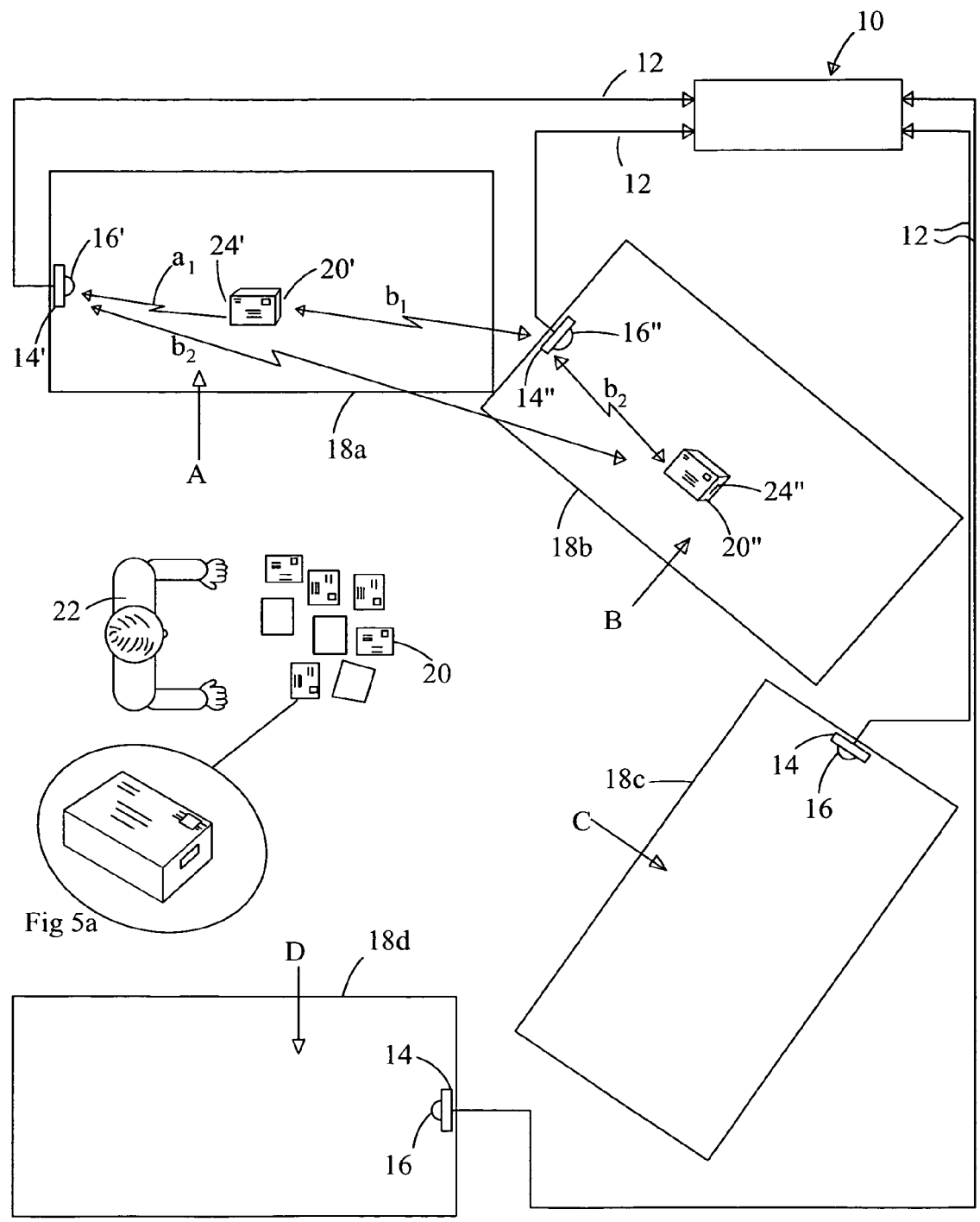
FIG. 5 is, in plan view, a representation of the first example given in the present application of a postal worker sorting packages into bulk containers wherein the correct placement of packages into the correct container is the subject of automatic validation according to the method of the present invention.
Figure 6:
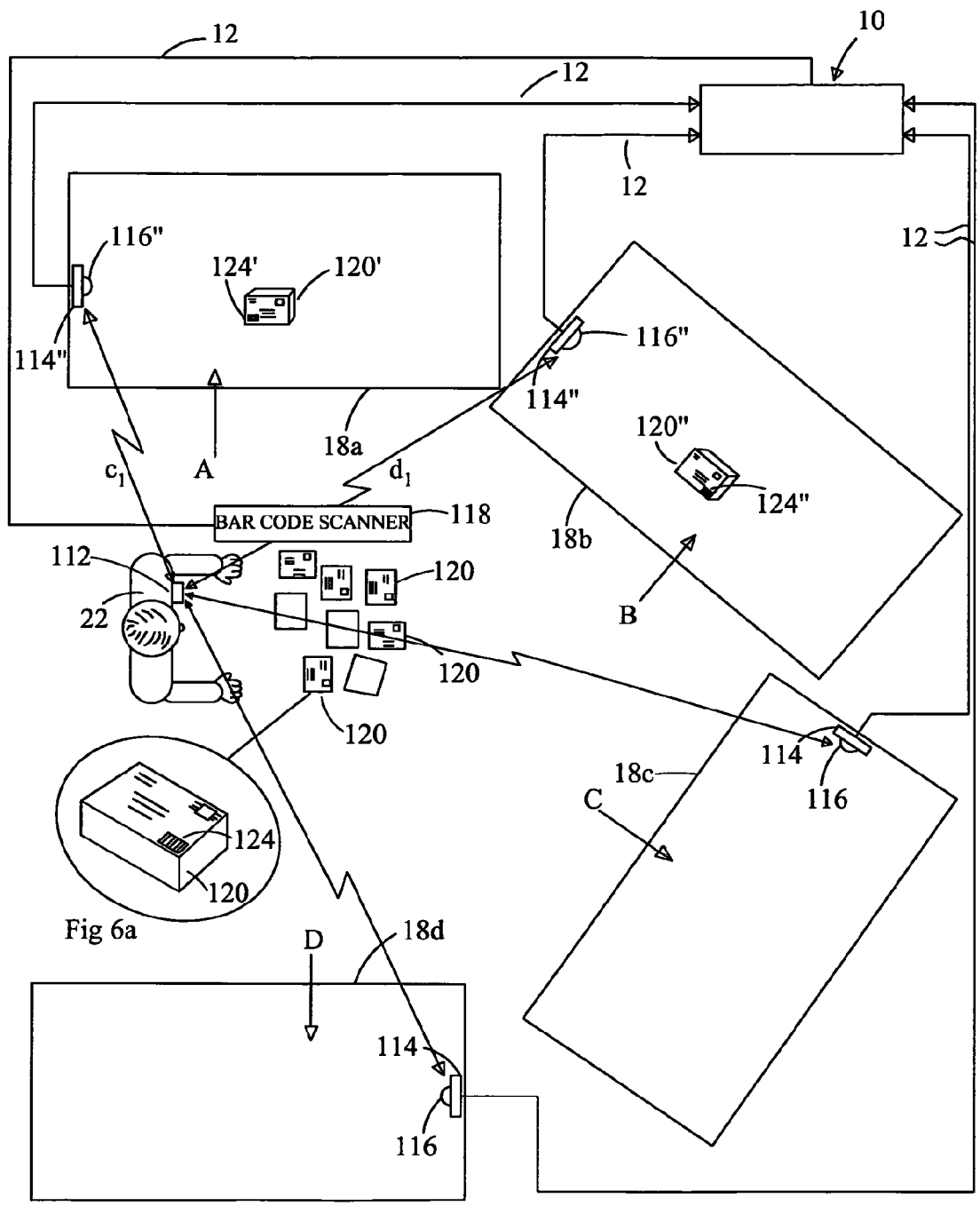
FIG. 6 is, in plan view, an alternative embodiment of FIG. 5.

Two examples of a postal worker sorting packages are illustrated in FIGS. 5 and 6. The examples are not intended to be limiting.

In the example of FIG. 5, a processor 10 is programmed to receive data via network 12 from RFID readers 14, 14' and 14", where in one embodiment each reader is also equipped with a motion detector sensor 16.

Each of bins 18a, 18b, 18c, and 18d is equipped with at least a single RFID reader 14 into which packages 20 may be deposited by a postal worker 22 in directions A, B, C or D corresponding to individual bins 18a-18d.

Packages 20 are sorted according to the destination to which they are to be sent by postal worker 22 depositing for example a package 20' into bin 18a so as to bring an RFID tag 24 mounted to the package into the read range radius of the corresponding RFID reader 14.

RFID reader 14' mounted in bin 18a detects the presence of package 20' for example by reason of it triggering corresponding motion detector sensor 16'. This piece of data is stored within memory within processor 10. RFID reader 14' also reads the radio frequency signal from RFID tag 24' mounted on package 20'. Package 20' is a distance $a_1$ from RFID reader 14'. Consequently, RFID reader 14' detects a signal strength from RFID tag 24' which is inversely proportional to distance $a_1$. As RFID reader 14' cyclically interrogates RFID tag 24', the presence of RFID tag 24' is repeatedly recorded, each successful interrogation identifying RFID tag 24' being recorded within processor 10 by an incrementally increasing scan count. The corresponding clock time corresponding to the successful identification of RFID tags 24' is also recorded as data corresponding to that tag. Consequently, data corresponding to at least these four variables, namely, motion detected (yes/no), radio frequency signal strength (variable), scan count (incremental count) and corresponding clock time (actual time), are recorded within processor 10 as detected by RFID reader 14' detecting the presence of RFID tag 24' on package 20'.

Simultaneously, if a package 20" has been deposited by postal worker 22 into bin 18b, RFID reader 14' will also detect RFID tag 24". Processor 10 will thus record data for package 20" as detected by RFID reader 14' according to the same four variables. In particular, motion detector sensor 16' will not have detected the presence of package 20" and so the sensor detection data for this variable corresponding to package 20" will be negative. The signal strength detected by RFID reader 14' corresponding to RFID tag 24" will be inversely proportional to the distance $a_2$ as measured between RFID reader 14' and RFID tag 24". Again the number of successful interrogations identifying RFID tag 24" will be recorded by an incrementally increasing corresponding scan count and the time of such successful interrogation will also be recorded.

Similarly, RFID reader 14" will detect the presence of both RFID tag 24' and RFID tag 24" on corresponding packages 20' and 20". The data collected by RFID reader 14" will be recorded by processor 10 and stored as data according to the same four variables but this time as read by RFID reader 14". Thus the motion detector sensor 16" associated with RFID reader 14" will have positively detected the presence of package 20" as package 20" is inserted in direction B by postal worker 22 into bin 18b, and thus the data will be a positive value for the motion corresponding to package 20". Conversely, motion detector sensor 16" will not have detected motion corresponding to package 20' because package 20' was not put into bin 18b, but was, rather, put into bin 18a. Thus the data for this variable for package 20' is negative. The signal strength recorded by RFID reader 14" from RFID tag 24" is inversely proportional to distance $b_2$ as measured between RFID reader 14" and RFID tag 24". Similarly, the signal strength read by RFID reader 14" from RFID tag 24' is inversely proportional to distance $b_1$ measured between RFID reader 14" and RFID tag 24'. As with RFID reader 14', RFID reader 14" repeatedly interrogates and records the successful interrogation of RFID tag 24" resulting in corresponding incrementally increased scan counts and the recording of the time of such successful interrogations.

The recording and tallying of data according to the four variables continues for all packages having RFID tags sensed by all of the RFID readers 14 so that a data base of data is maintained and updated for each detected RFID tag. The algorithm program in the software being implemented within processor 10, compares the weighted measured data (weighted from least important to most important as set out in FIG. 1) for each of the variables when taken cumulatively for each of the successfully interrogated RFID tags and selects the tag with the highest cumulative value as representing the tag with the highest probability of being associated with a particular RFID reader thereby automatically verifying that a particular package is in a desired bin.

In the example of FIG. 6 the worker wears the RFID reader and the RFID tags are on the bins, rather than on the packages. In particular, a processor 10 is programmed to receive data via network 12 from RFID reader 112 worn by worker 22. In this example each tag 114 is equipped with a motion detector sensor 116. Each of bins 18a, 18b, 18c, and 18d is equipped with at least a single RFID tag 114. Packages 120 may be deposited into the bins by a postal worker 22 in directions A, B, C or D corresponding to individual bins 18a, 18b, 18c or 18d.

Packages 20 are sorted according to the destination to which they are to be sent by postal worker 22 picking up a package 120 waiting to be sorted, and, firstly, scanning the package using a scanner such as bar code reader 118 to determine the unique identity of the particular package as encoded on its corresponding bar code label 124 seen in FIG. 6a. Memory within processor 10 stores this identity information. The package is then deposited into a bin destined for a location corresponding to the intended destination of the package. Thus a package 120' is deposited into bin 18a because the intended destination of package 120 corresponds to the destination of bin 18a.

RFID tag 114' mounted in bin 18a detects the presence of package 120' for example by reason of it triggering corresponding motion detector sensor 116'. This piece of data is correlated to the packages identity information and stored within memory within processor 10. RFID reader 112 reads the radio frequency signal from RFID tag 114'. Tag 114' is a distance $c_1$ from RFID reader 112. Consequently, RFID reader 112 detects a signal strength from RFID tag 114' which is inversely proportional to distance $c_1$. As RFID reader 112 cyclically interrogates RFID tag 114', the presence of RFID tag 114' is repeatedly recorded, each successful interrogation identifying RFID tag 114' being recorded within processor 10 by an incrementally increasing scan count. The corresponding clock time corresponding to the successful identification of RFID tags 114' is also recorded as data corresponding to that tag and thus correlated to the particular package 120'. Consequently, data corresponding to at least these four variables are recorded within processor 10 as detected by RFID reader 112 correlating to the identity of package 120' and thereby confirming the presence of package 120' in bin 18a.

If a package 120" has next been deposited by worker 22 into bin 18b, RFID reader 112 will also detect RFID tag 114" signalling that it has detected the presence of package 120" by the triggering of the corresponding motion detector 116" on tag 114". Processor 10 will thus record data for package 120" as detected by RFID reader 112 according to the same four variables. In particular, motion detector sensor 116' will not have detected the presence of package 120" while sensor 116" will have detected its presence. Because package 120" was scanned on scanner 118 following scanning of package 120', sensor detection data from tag 120" will be correlated to package 120". The signal strength detected by RFID reader 112 corresponding to RFID tag 114" will be inversely proportional to the distance $d_2$ as measured between RFID reader 112 and RFID tag 114". Again the number of successful interrogations identifying RFID tag 114" will be recorded by an incrementally increasing corresponding scan count and the time of such successful interrogation will also be recorded and stored in processor 10 as correlating to package 120".

The recording and tallying of data according to the four variables continues for all packages being scanned on scanner 118 and detected by the RFID tags in the various bins so that a data base of data is maintained and updated for each detected package. The algorithm program in the software being implemented within processor 10, compares the weighted measured data for each of the variables when taken cumulatively for each of the successfully interrogated RFID tags and selects the tag with the highest cumulative value as representing the tag with the highest probability of being associated with a particular package thereby automatically verifying that the particular package is in the desired bin.

In the vehicle distribution center example, the center has a large parking lot containing row after row of densely packed arrays of parked vehicles numbering sometimes in the tens of thousands of vehicles. A database exists of all of the parked vehicles. The database contains the manufactures unique identification data for each vehicle. A "pick-list" is generated by the enter which identifies vehicles to be culled from the parking lot by their unique identification. Typically each vehicle has been tagged with an RFID tag which, in the example of a "reader-speaks-first" RFID system, responds as the tags are polled by stationary or mobile RFID tag readers. The RFID location system then generates location data for each vehicle on the pick-list in the form of a probability zone for each tag in which the individual tag is calculated to be. If for example a moving reader is employed then multiple probability zones may be generated for each tag being sought.

Figure 7:
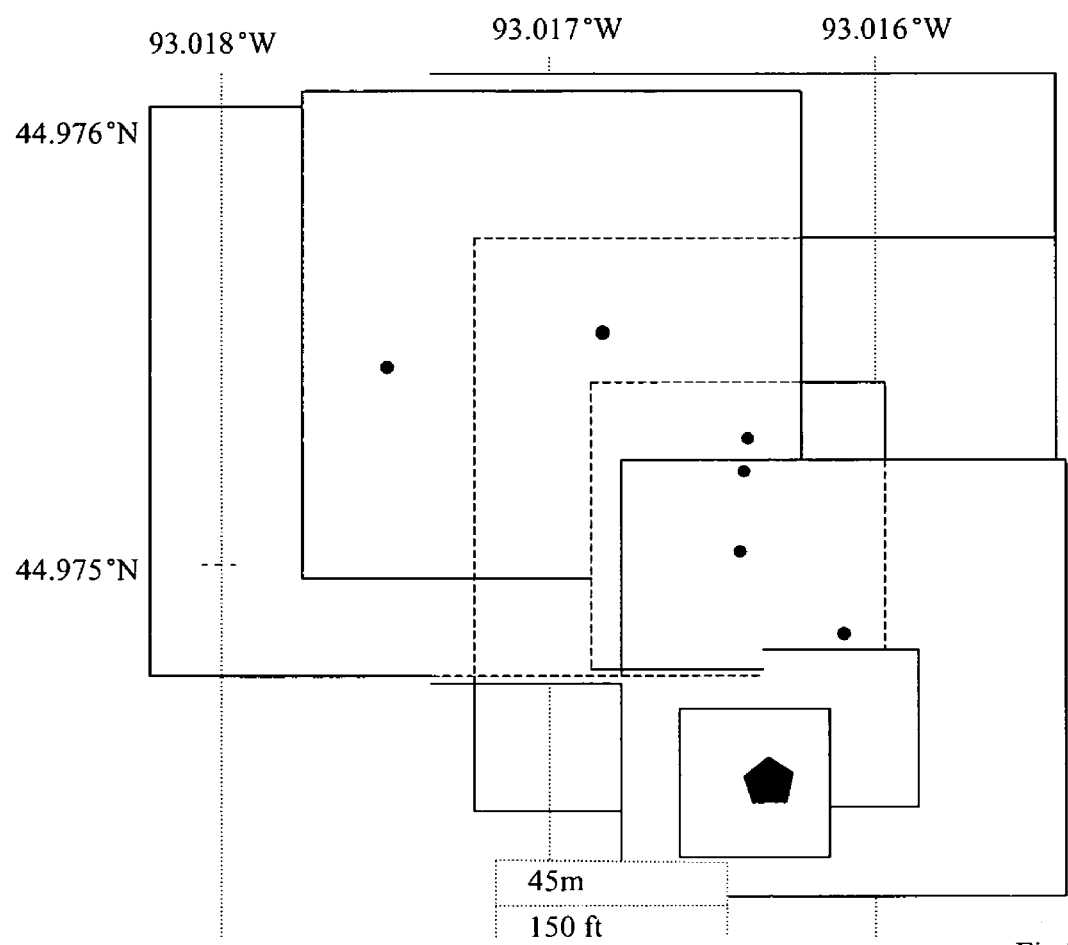
FIG. 7 is a diagrammatic representation of eight overlapping proximity zones generated by an RFID location system employing a mobile reader to locate a single tag on a vehicle in distribution center parking lot.

In the illustrated example of FIG. 7, eight RFID datapoints have been generated by the moving reader to identify the location of a single tag. Each datapoint has an associated probability zone, shown diagrammatically as squares in FIG. 7, which have been calculated as the area most likely to contain the tag.

As seen in FIG. 8, a positioning algorithm has calculated a "weighted best fit" using a "logical pyramid", for example that of FIG. 1, but including the overlap of the "probability zones" to calculate a more precise location. The outer dotted line square is outside bound of possible vehicle location generated by combining the probability zones. The inner dotted line rectangle is the more precise location calculated with the "weighted best fit" algorithm. The actual tag location is within the inner rectangle.

An RFID reader has been reconfigured to "spoof" the keyfob for the specific vehicle(s) being sought and to transmit the corresponding "panic" code, thereby triggering the panic alarm and showing the worker the specific vehicle(s) that are to be processed. Thus the RFID locating system location data has been used to bring the worker close to the location of the specific vehicle(s), then the keyfob spoofing from the reader identifies the exact vehicle(s). This eliminates ambiguity from the vehicle picking process used to locate the vehicles on the pick list, and thereby dramatically reduces time spent looking for specific vehicles, and helps to eliminate mistakes.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for resolving RFID-based object traffic transactions to a single object in the presence of a plurality of objects comprising the steps of:
   a) monitoring RFID object traffic transactions to a single object amongst a plurality of objects wherein said traffic transactions are between at least one RFID reader and a plurality of detected RFID tags detected by said at least one RFID reader, wherein said at least one RFID reader is chosen from the group consisting of: a plurality of stationary RFID readers, at least one mobile RFID reader,
   b) calculating a cumulative and weighted data set for each detected RFID tag of said RFID tags,
   c) comparing said data set for said each detected RFID tag with said data set for other of said detected RFID tags and identifying one RFID tag of said detected RFID tags having a greatest cumulative weight calculated for its corresponding said data set so as to resolve multiple detections and identifications of said detected RFID tags in said object traffic transactions to said single object,
   d) calculating a plurality of overlapping proximity zones for said single object and combining said proximity zones so as to determine a maximum overlapped area having the greatest number of overlaps of said plurality of overlapping proximity zones, wherein said maximum overlapped area coincides with an area of increased probability of location of said single object,
   wherein said data set includes the following data for said each detected RFID tag: radio frequency signal strength, an incremental count of the number of said RFID tag detections and identifications, and the corresponding clock time for each count in said incremental count,
   and wherein said data is, in order of most important to least important, weighted by said signal strength, said incremental count, and said corresponding clock time.

2. The method of claim 1 wherein said single object and each of said plurality of objects have their own attention-attracting device triggered by a remote unique code transmitted remotely to said device, the method further comprising the steps of:
   a) determining the unique code associated said single object,
   b) setting said at least one reader to spoof the unique code of said single object,
   c) within said maximum overlapped area remotely spoofing the unique code of said single object so as to trigger the attention-attracting device of said single object.

3. The method of claim 1 wherein said at least one RFID reader interrogates said RFID tags for said identification of said tags.

4. The method of claim 1 wherein said single object is a single vehicle parked in at least one array of parked vehicles.

5. The method of claim 4 wherein said at least one reader is said at least one mobile reader.

6. The method of claim 5 wherein said at least one mobile reader is a single mobile RFID tag reader.

7. The method of claim 2 wherein said single object is a single vehicle parked in at least one array of parked vehicles.

8. The method of claim 7 wherein said at least one reader is said at least one mobile reader.

9. The method of claim 8 wherein said at least one mobile reader is a single mobile RFID tag reader.

10. The method of claim 2 wherein said attention-attracting device is a vehicle alarm and wherein said alarm is remotely triggered by an alarm code unique to said single vehicle when said spoofed by said at least one reader.

11. The method of claim 9 wherein said attention-attracting device is a vehicle alarm and wherein said alarm is remotely triggered by an alarm code unique to said single vehicle when said spoofed by said at least one reader.

12. A system for resolving RFID-based object traffic transactions to a single object in the presence of a plurality of objects comprising:
   a) at least one RFID reader and a plurality of RFID tags detectable by said at least one RFID reader,
   b) means for monitoring RFID object traffic transactions to a single object amongst a plurality of objects wherein said traffic transactions are between at least one RFID reader and a plurality of detected RFID tags detected by said at least one RFID reader, wherein said at least one RFID reader is chosen from the group consisting of: a plurality of stationary RFID readers, at least one mobile RFID reader,
   c) processor means for calculating a cumulative and weighted data set for each detected RFID tag of said RFID tags,
   d) processor means for comparing said data set for said each detected RFID tag with said data set for other of said detected RFID tags and identifying one RFID tag of said detected RFID tags having a greatest cumulative weight calculated for its corresponding said data set so as to resolve multiple detections and identifications of said detected RFID tags in said object traffic transactions to said single object,
   e) calculating a plurality of overlapping proximity zones for said single object and combining said proximity zones so as to determine a maximum overlapped area having the greatest number of overlaps of said plurality of overlapping proximity zones, wherein said maximum overlapped area coincides with an area of increased probability of location of said single object,
   wherein said data set includes the following data for said each detected RFID tag: radio frequency signal strength, an incremental count of the number of said RFID tag detections and identifications, and the corresponding clock time for each count in said incremental count,
   and wherein said data is, in order of most important to least important, weighted by said signal strength, said incremental count, and said corresponding clock time.

13. The system of claim 12 wherein said single object and each of said plurality of objects have their own attention-attracting device triggered by a remote unique code transmitted remotely to said device, the method further comprising the steps of:
   a) determining the unique code associated said single object,
   b) setting said at least one reader to spoof the unique code of said single object,
   c) within said maximum overlapped area remotely spoofing the unique code of said single object so as to trigger the attention-attracting device of said single object.

14. The system of claim 12 wherein said single object is a single vehicle parked in at least one array of parked vehicles.

15. The system of claim 14 wherein said at least one reader is said at least one mobile reader.

16. The system of claim 15 wherein said at least one mobile reader is a single mobile RFID tag reader.

17. The system of claim 13 wherein said single object is a single vehicle parked in at least one array of parked vehicles.

18. The system of claim 17 wherein said at least one reader is said at least one mobile reader.

19. The system of claim 18 wherein said at least one mobile reader is a single mobile RFID tag reader.

20. The system of claim 13 wherein said attention-attracting device is a vehicle alarm and wherein said alarm is remotely triggered by an alarm code unique to said single vehicle when said spoofed by said at least one reader.

21. The system of claim 19 wherein said attention-attracting device is a vehicle alarm and wherein said alarm is remotely triggered by an alarm code unique to said single vehicle when said spoofed by said at least one reader.

22. The system of claim 12 wherein said at least one RFID reader interrogates said RFID tags for said identification of said tags.

23. The method of claim 1 further comprising the step of identifying a location of said at least one RFID reader to facilitate a location calculation of the corresponding said plurality of detected RFID tags.

24. The method of claim 23 wherein said step of identifying a location of said at least one RFID reader includes providing in said at least one RFID reader means for cooperating with said global positioning system whereby a user is provided with said location of said at least one RFID reader by the global positioning system.

25. The method of claim 24 further comprising the step of applying a correction factor to reduce a location error in said location calculation.

26. The method of claim 25 further comprising the step of calculating said correction factor by determining when one of said at least one RFID readers is in close proximity to one of said plurality of detected RFID tags, determining corresponding location error in said location provided by the global positioning system, applying a correction of said location error to all said location calculations of said plurality of detected RFID tags.

27. The system of claim 12 further comprising means for identifying a location of said at least one RFID reader to facilitate a location calculation of the corresponding said plurality of detected RFID tags.

28. The system of claim 27 wherein said means for identifying a location of said at least one RFID reader includes means for cooperating with said global positioning system whereby a user is provided with said location of said at least one RFID reader by the global positioning system.

29. The system of claim 28 further comprising means for applying a correction factor to reduce a location error in said location calculation.

30. The system of claim 29 further comprising means for calculating said correction factor by determining when one of said at least one RFID readers is in close proximity to one of said plurality of detected RFID tags, determining corresponding location error in said location provided by the global positioning system, and applying a correction of said location error to all said location calculations of said plurality of detected RFID tags.

* * * * *